US012317382B2

(12) United States Patent
Wong

(10) Patent No.: US 12,317,382 B2
(45) Date of Patent: May 27, 2025

(54) DIMMING METHOD AND DIMMING CIRCUIT

(71) Applicant: Joulwatt Technology Co., Ltd., Hangzhou (CN)

(72) Inventor: Pitleong Wong, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 272 days.

(21) Appl. No.: 18/128,250

(22) Filed: Mar. 30, 2023

(65) Prior Publication Data

US 2023/0328854 A1 Oct. 12, 2023

(30) Foreign Application Priority Data

Mar. 30, 2022 (CN) ......................... 202210330350.9

(51) Int. Cl.
*H05B 45/14* (2020.01)
*H05B 45/325* (2020.01)

(52) U.S. Cl.
CPC ........... *H05B 45/14* (2020.01); *H05B 45/325* (2020.01)

(58) Field of Classification Search
CPC ............. H02M 1/0009; H02M 1/0058; H02M 3/1584; H03K 17/687; H05B 45/325; H05B 45/14; Y02B 70/10
See application file for complete search history.

(56) References Cited

U.S. PATENT DOCUMENTS

2012/0069606 A1* 3/2012 Sagneri ................ H02M 3/335 363/21.02

* cited by examiner

*Primary Examiner* — Monica C King
(74) *Attorney, Agent, or Firm* — Bayramoglu Law Offices LLC

(57) ABSTRACT

A dimming method and a dimming circuit for driving LED load are provided. The dimming circuit includes a power stage circuit, and the power stage circuit includes a power switch transistor. After the power stage circuit enters the DCM working mode, it obtains a first integral value according to the inductance current in a switch period of the power switch transistor, and obtains second time according to the first integral value and a duty cycle of a PWM dimming signal; when the switch period reaches the second time, the power switch transistor is controlled to be turned on to start the next switch period; a first upper limit voltage is set to a fixed voltage; the power switch transistor is controlled to be turned off when a sampling signal of the inductance current representing the inductance current of the power stage circuit reaches the first upper limit voltage.

14 Claims, 5 Drawing Sheets

DIMMING METHOD AND DIMMING CIRCUIT

CROSS REFERENCE TO THE RELATED APPLICATIONS

This application is based upon and claims priority to Chinese Patent Application No. 202210330350.9, filed on Mar. 30, 2022, the entire contents of which are incorporated herein by reference.

TECHNICAL FIELD

The present invention relates to the field of electronic circuits, particularly, to a dimming method and a dimming circuit.

BACKGROUND

In the existing dimming circuit using pulse width modulation (PWM) dimming signal for dimming, as shown in FIG. 1, the PWM conversion circuit receives the PWM dimming signal and generates a reference voltage signal Vref related to the duty cycle of the PWM dimming signal, and then uses the operational amplifier U00 to perform an error amplification operation on the reference voltage signal Vref and the feedback voltage FB representing the LED current to obtain a compensation signal Vcomp; the control module obtains the switch signal gate which controls power switch M00 to turn on and off according to the compensation signal Vcomp. In the dimming circuit shown in FIG. 1, the magnitude of the reference voltage signal Vref is adjusted by the PWM dimming signal to adjust the magnitude of the output current, thereby achieving the purpose of adjusting the brightness of the LED. When the duty cycle of the PWM dimming signal is relatively small, the average voltage values of the reference voltage signal Vref and the feedback voltage FB representing the LED current are relatively small. Since the operational amplifier U00 itself has deviation, the dimming error will be large and the dimming accuracy will be poor. Moreover, when the duty cycle of the PWM dimming signal is relatively small, the switch power supply enters the low-frequency PFM working mode. In this working mode, the switching frequency is easily disturbed by noise, thus causing unstable switching frequency, which leads to unstable current supplied to the LED load.

SUMMARY

In view of this, the objective of the present invention is to provide a dimming method and a dimming circuit to solve the technical problem that in the prior art, when the duty ratio of the PWM dimming signal is relatively small, the dimming accuracy is poor, and the current supplied to the LED load is not stable.

The technical solution of the present invention is to provide a dimming method applied in a dimming circuit to drive the LED load, and the dimming circuit includes a power stage circuit; the power stage circuit includes a power switch transistor; after the power stage circuit enters the DCM working mode, obtaining a first integral value according to the inductance current in a switch period of the power switch transistor, and obtaining second time according to the first integral value and a duty cycle of a PWM dimming signal; controlling the power switch transistor to turn on to start the next switch period when the switch period reaches the second time;

setting a first upper limit voltage to a fixed voltage; when a sampling signal of the inductance current representing the inductance current of the power stage circuit reaches the first upper limit voltage, controlling the power switch transistor to turn off.

Optionally, the first integral value is obtained according to the inductance current of the first time in a switch period of the power switch transistor;

wherein the first time includes the time when the inductance current in the switch period is not zero.

Optionally, the dimming method includes:

generating a first current according to the sampling signal of the inductance current;

generating a second current related to the duty cycle of the PWM dimming signal according to the PWM dimming signal;

charging a first capacitor by the first current, and the second current makes the first capacitor discharge;

after the power stage circuit enters the DCM working mode, the second time is the time starting from the starting moment of the switch period to when the voltage of the first capacitor reaches the first threshold voltage in the switch period;

wherein the current value of the second current is greater than zero.

Optionally, the first current charges the first capacitor within the first time;

wherein the first time include the time that the inductance current is not zero.

Optionally, when the duty cycle of the PWM dimming signal is smaller than n, amplifying the first current by m times;

meanwhile amplifying the duty cycle of the PWM dimming signal by m times to obtain a second dimming signal, and generating a second current related to the duty cycle of the second dimming signal according to the second dimming signal;

wherein, n is a positive number greater than 0 and less than or equal to 0.1, m is a positive number greater than 1, and the product of n and m is less than or equal to 1.

Optionally, when the duty cycle of the PWM dimming signal is less than n, the capacitance value of the first capacitor is simultaneously amplified by m times.

Optionally, the dimming method includes:

detecting the first capacitive voltage at the first moment;

if the first capacitive voltage at the first moment is greater than the first threshold voltage, controlling the power switch transistor to be turned on to start the next switch period when the first capacitive voltage reaches the first threshold voltage;

if the first capacitive voltage at the first moment is smaller than or equal to the first threshold voltage, controlling the power switch transistor to turn on to start the next switch period when the clock signal denotes valid, wherein the first moment is the moment that starts from the start moment of a switch period and delays by a third time, and the third time is equal to the period of the clock signal.

Optionally, the first upper limit voltage is obtained according to the difference between the first threshold voltage and the second voltage;

wherein, the second voltage is the first capacitive voltage at the moment when the power switch transistor starts to turn on.

Optionally, the first upper limit voltage is obtained according to the difference between the first threshold voltage and the second voltage;

wherein, the second voltage is the first capacitive voltage at the time when the clock signal denotes valid.

In the second aspect, the present invention further provides a dimming circuit for driving the LED load; the dimming circuit includes a power stage circuit and a dimming control circuit, and the power stage circuit includes a power switch transistor, wherein after the power stage circuit enters the DCM working mode, the dimming control circuit:

obtains a first integral value according to the inductance current in a switch period of the power switch transistor; obtains second time according to the first integral value and a duty cycle of a PWM dimming signal; when the switch period reaches the second time, controls the power switch transistor to turn on to start the next switch period;

setting a first upper limit voltage to a fixed voltage; when a sampling signal of the inductance current representing the inductance current of the power stage circuit reaches the first upper limit voltage, controls the power switch transistor to turn off.

Optionally, the dimming control circuit includes a first computation circuit, the first computation circuit including:

a first current generation circuit, outputting a first current according to the sampling signal of the inductance current;

a second current generation circuit, receiving the PWM dimming signal, and outputting a second current related to the duty cycle of the PWM dimming signal;

a first capacitor, charging the first capacitor by using the first current, and the second current makes the first current discharge;

a first comparative circuit, the first input terminal receives a first threshold voltage, and the second input terminal receives the first capacitive voltage and generates a first turning-on signal according to the comparison result of the first capacitive voltage and the first threshold voltage;

after the power stage circuit enters the DCM working mode, the first turning-on signal denotes that the switch period achieves the second time, and the dimming control circuit controls the turning-on of the power switch transistor according to the first turning-on signal;

wherein the current value of the second current is greater than zero.

Optionally, the first current generation circuit includes:

a first voltage control current source, receiving the sampling signal of the inductance current to output the first current.

Optionally, the second current generation circuit includes:

a filtering circuit, receiving the PWM dimming signal, and filtering the PWM dimming signal to output the filtering signal;

a second voltage control current source, receiving the filtering signal to output the second current.

Optionally, the first computation circuit further includes:

a second control circuit, detecting the inductance current or the first current and outputting the first control signal, and the first control signal is in a valid state at least when the current value of the inductance current or the first current is not zero;

a first switch, its first terminal is connected to the output terminal of the first current generation circuit, its second terminal is connected to the first capacitor, and the control terminal receives the first control signal;

the first switch is turned on when the first control signal is valid; the first switch is turned off when the first control signal is invalid.

Optionally, the first computation circuit further includes a duty cycle detection circuit, and the duty cycle detection circuit is configured to output a ratio control signal upon detecting that the duty cycle of the PWM dimming signal is smaller than n;

a first current generation circuit, configured to amplify the first current by m times upon receiving the ratio control signal;

a second current generation circuit, including a duty cycle amplification circuit, the duty cycle amplification circuit is configured to amplify the duty cycle of the PWM dimming signal by m times upon receiving the ratio control signal to obtain a second dimming signal, and the second current generation circuit generates a second current related to the duty cycle of the second dimming signal according to the second dimming signal;

wherein n is a positive greater than 0 and smaller than or equal to 0.1, m is a positive great than 1, and a product of n and m is smaller than or equal to 1.

Optionally, amplifying the capacitance value of the first capacitor by m times when the ratio control signal is valid.

Optionally, the dimming control circuit further includes a first control circuit, and the first control circuit includes:

a turning-on signal generation circuit, configured to generate a turning-on signal to control the start moment of the next switch period of the power switch transistor according to the comparison result of the first capacitive voltage at the first moment and the first threshold voltage;

if the first capacitive voltage at the first moment is greater than the first threshold voltage, generating the turning-on signal according to the first turning-on signal;

if the first capacitive voltage at the first moment is smaller than or equal to the first threshold voltage, generating the turning-on signal according to the clock signal;

wherein the first moment is the moment that starts from the start moment of a switch period and delays by a third time, and the third time is equal to the period of the clock signal.

Compared with the prior art, the present invention has the following advantages: avoiding using the operational amplifier when the duty cycle of the PWM dimming signal is small, so as to reduce the dimming error; moreover, the present invention can avoid processing small signals and further reduces the dimming error, so as to realize high dimming accuracy when the duty cycle of the PWM dimming signal is relatively small; on the other hand, the present invention can avoid using the operational amplifier to control the low-frequency PFM working mode, so as to avoid that the current flowing through the LED load from being unstable, realizing providing the LED load with stable current while the duty cycle of the PWM dimming signal is relatively small.

DETAILED DESCRIPTION OF THE EMBODIMENTS

The following will describe in great detail the preferred embodiments of the present invention by combining with the accompanying drawings. However, the present invention is not restricted to these embodiments. The present invention covers any replacement, amendments, equivalent methods and solutions made within the scope and spirits of the present invention.

In order to make the public to have a thorough understanding of the present invention, details are provided in the following detailed description of the preferred embodiments of the present invention; however, those skilled in the art can totally understand the present invention without the descriptions of these details.

The present invention will be described in more details by way of illustration by referring to the accompanying drawings in the following paragraphs. It needs to explain that the accompanying drawings all use simplified forms and use non-accurate ratios, and are merely for helping to illustrate the embodiments of the present invention conveniently and clearly.

Figure 1:
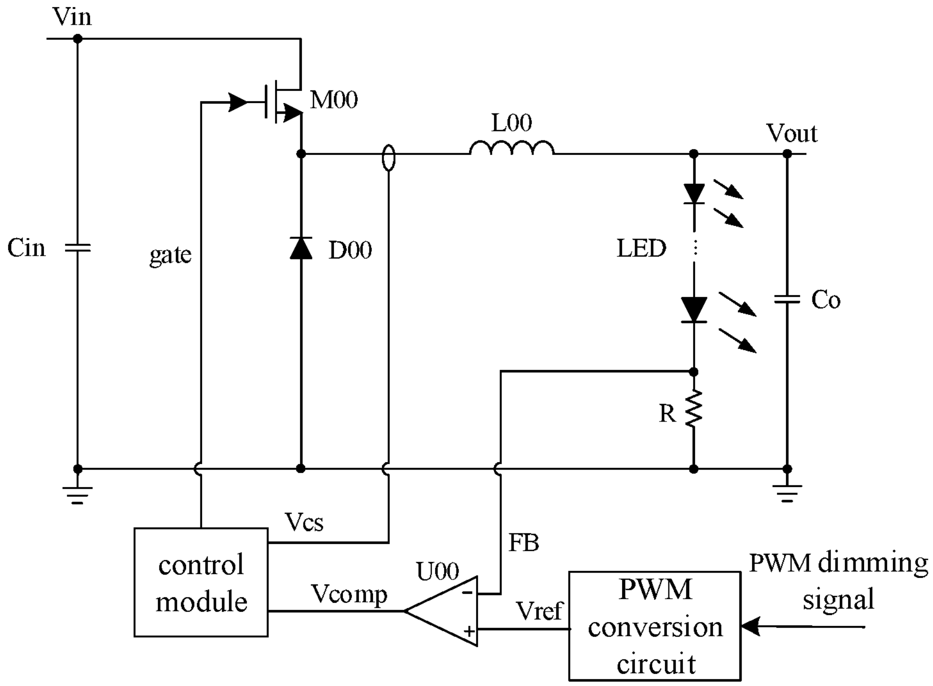
FIG. 1 (Prior Art)
FIG. 1 is a schematic view of a prior art dimming circuit.
Figure 2:
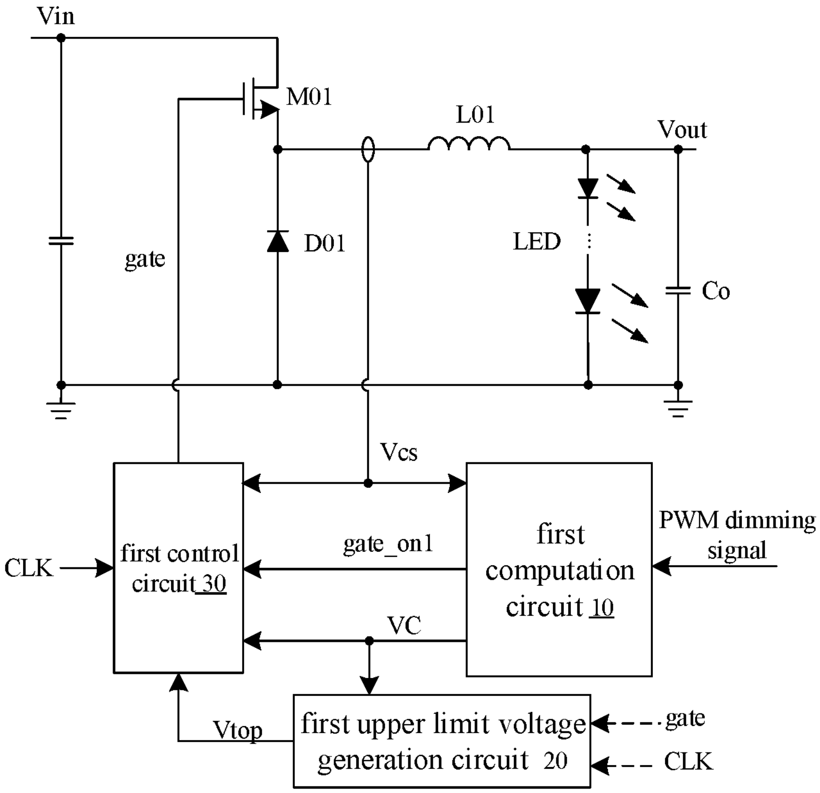
FIG. 2 is a schematic view of the dimming circuit according to an embodiment of the present invention.
Figure 5:
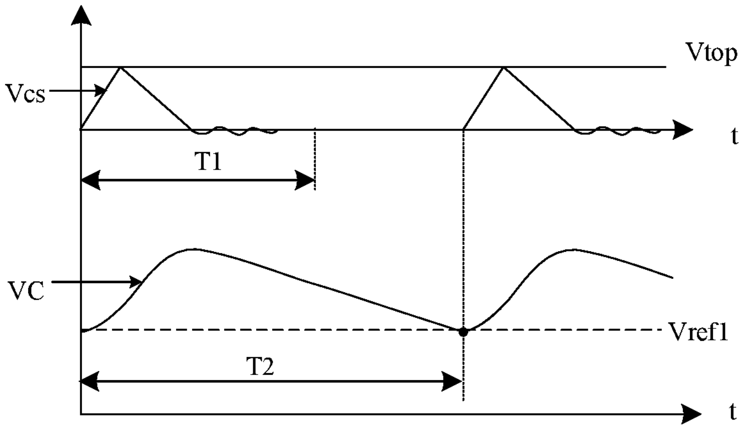
FIG. 5 is a waveform schematic view after the power stage circuit enters the DCM working mode of the embodiment of the present invention.

As shown in FIG. 2, it is a schematic view of the dimming circuit of an embodiment of the present invention, which includes a power stage circuit and a dimming control circuit; wherein the power stage circuit uses Buck topology as an example, including a power switch transistor M01, a second power transistor D01, and an inductor L01, wherein the power transistor M01 may be an MOS transistor, the second power transistor D01 may be a freewheeling diode; the dimming control circuit generates a switch signal gate according to the PWM dimming signal to control the turning-on and -off of the power switch transistor M01. The dimming control circuit includes a first computation circuit 10, a first upper limit voltage generation circuit 20, and a first control circuit 30; after the power stage circuit enters the discontinuous conduction mode (DCM), the first computation circuit 10 obtains the second time T2 according to the inductance current sampling signal Vcs denoting the inductance current and the PWM dimming signal, to generate a first turning-on signal gate_on1 denoting that the switch period achieves the second time T2, and the first control circuit 30 controls the power switch transistor M01 to turn on to start the next switch period according to the first turning-on signal gate_on1. The first upper limit voltage generation circuit 20 sets the first upper limit voltage Vtop as a fixed voltage; when the inductance current sampling signal Vcs achieves the first upper limit voltage Vtop, the first control circuit 30 controls the power switch transistor M01 to turn off. Refer to FIG. 5, it shows a waveform schematic view of the inductance current sampling signal Vcs after the power stage circuit enters the DCM working mode. When the switch period achieves the second time T2, the power switch transistor M01 turns on to start the next switch period, and the inductance current sampling signal Vcs starts to rise; the first upper limit voltage Vtop is a fixed voltage; when the inductance current sampling signal Vcs achieves the first upper limit voltage Vtop, the first control circuit 30 controls the power switch transistor M01 to turn off, and the inductance current sampling signal Vcs starts to drop.

It needs to explain that in this embodiment, the second power transistor D01 is a freewheeling diode, in other embodiments, the second power transistor D01 may also be a synchronous rectifying MOS transistor, and the dimming control circuit controls the power transistor M01 and the synchronous rectifying MOS transistor. On the other hand, it is easy for those skilled in the art to replace the BUCK topology of the power stage circuit by other topologies, details omitted here.

Figure 3:
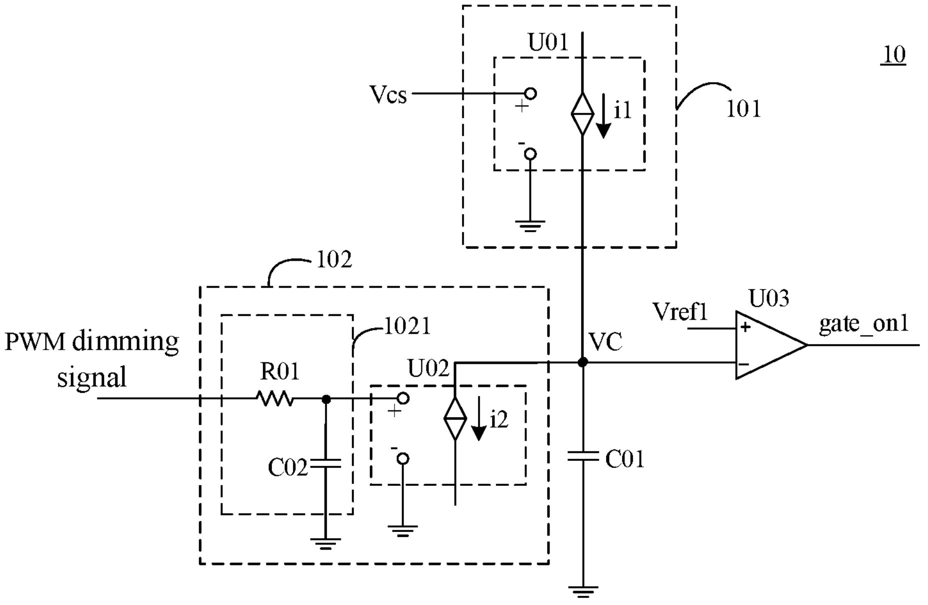
FIG. 3 is a schematic view of an implementation of the first computing circuit of the present invention.

Specifically, in one embodiment, as shown in FIG. 3, the first computation circuit 10 includes a first current generation circuit 101, a second current generation circuit 102, a first capacitor C01, and a first comparative circuit U03. Wherein, the first current generation circuit 101 outputs a first current i1 according to the inductance current sampling signal Vcs; The second current generation circuit 102 receives the PWM dimming signal and outputs a second current i2 relates to the duty cycle of the PWM dimming signal, wherein the current value of the second current i2 is greater than zero; The first terminal of the first capacitor C01 is connected to the ground, and the second terminal is connected to the output terminal of the first current generation circuit 101 and the output terminal of the second current generation circuit 102; the first current i1 charges the first capacitor, and the second current i2 makes the first capacitor discharge, and the voltage of the second terminal of the first capacitor C01 is a first capacitive voltage VC; The first input terminal of the first comparative circuit U03 receives the first threshold voltage Vref1, and the second input terminal receives the first capacitive voltage VC, and generates a first turning-on signal gate_on1 according to the comparison results of the first capacitive voltage VC and the first threshold voltage Vref1. After the power stage circuit enters the DCM working mode, the first turning-on signal gate_on1 denotes that the switch period achieves the second time T2, and the dimming control circuit controls the turning-on of the power switch transistor M01 according to the first turning-on signal gate_on1, and the corresponding wave forms of the inductance current sampling signal Vcs and the first capacitive voltage VC are as shown in FIG. 5, The second time T2 is the time from the starting moment of the switch period to that the first capacitive voltage VC achieves the first threshold voltage Vref within the switch period; when the switch period achieves the second time T2, i.e., when the first capacitive voltage VC achieves the first threshold voltage Vref1, it controls the power switch transistor M01 to turn on to start the next switch period. Exemplarily, the first current generation circuit 101 includes a first voltage control current source U01, and the first voltage control current source U01 receives the inductance current sampling signal Vcs to output the first current i1. Exemplarily, the second current generation circuit 102 includes a filter circuit 1021 and a second voltage control current source U02, The filter circuit 1021 receives the PWM dimming signal, and filters the PWM dimming signal to output the filtering signal; the second voltage control current source U02 receives the filtering signal to output the second current i2. Further exemplarily, the filter circuit 1021 may be an RC filter circuit including the first resistor R01 and the second capacitor C02.

Figure 4:
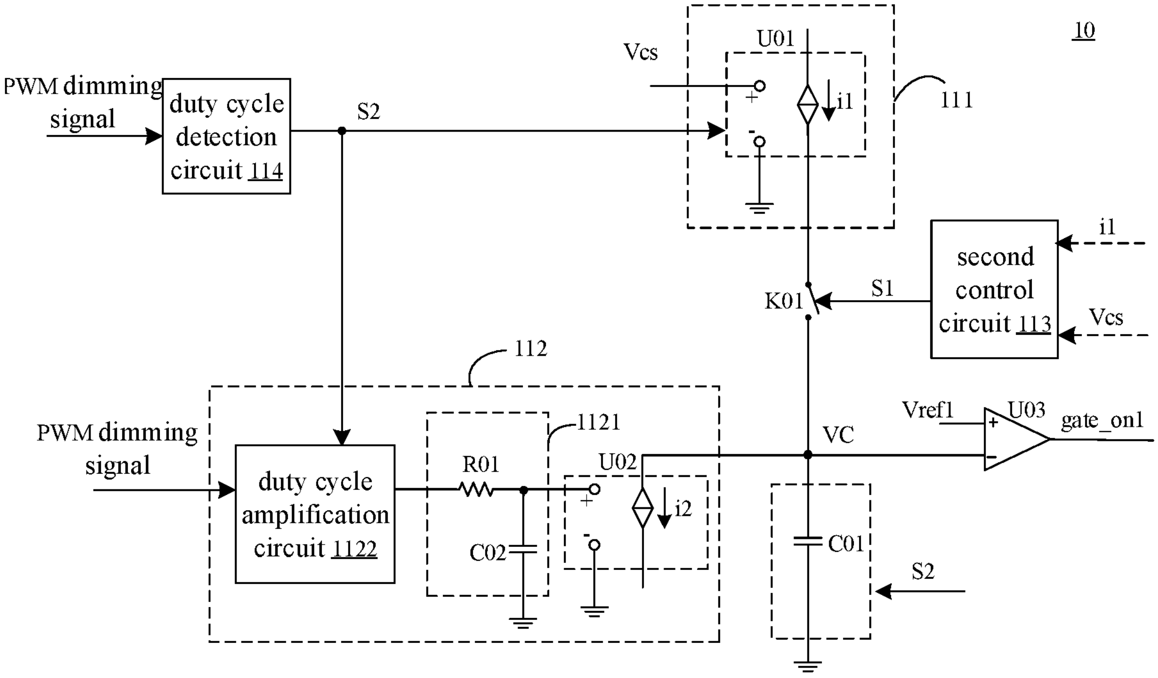
FIG. 4 is a schematic view of another implementation of the first computing circuit of the present invention.

Further, in an embodiment, as shown in FIG. 4, the first computation circuit 10 further includes a second control circuit 113 and a first switch K01. The second control circuit 113 detects the inductance current sampling signal Vcs or the first current i1 and outputs the first control signal S1, and the first control signal S1 is in a valid state at least when the inductance current signal Vcs or the current value of the first current i1 is not zero; The first terminal of the first switch K01 receives the first current i1, and the second terminal is connected to the first capacitor C01; the control terminal receives the first control signal S1; when the first control signal S1 is valid, the first switch K01 is turned on, and the first current i1 charges the first capacitor C01; when the first control signal S1 is invalid, the first switch K01 is turned off to cut off the charging path of the first current i1 to the first capacitor C01. Exemplarily, in an embodiment, as shown in FIG. 5, after the power stage circuit enters the DCM working mode, in a switch period, the first control signal S1 is valid within the first time T1, wherein the first time T1 is set as the time not shorter than that the inductance current sampling signal Vcs is not zero. In this embodiment, when the power stage circuit is in the DCM working mode, the first capacitor C01 is charged by controlling the first current i1 within the first time T1, which can reduce integration error and improve dimming accuracy.

It should be noted that as for “valid” and “invalid” mentioned in this specification, “valid” may correspond to high level, while “invalid” corresponds to low level; in another embodiment, it may also be that “valid” corresponds to low level, while “invalid” corresponds to high level.

Still refer to FIG. 4, in another embodiment, the first computation circuit 10 further includes a duty cycle detection circuit 114, and the duty cycle detection circuit 114 is configured to output a ratio control signal S2 upon detecting that the duty cycle of the PWM dimming signal is smaller than n. Correspondingly, in this embodiment, the first current generation circuit 111 is configured to amplify the first current i1 by m times when receiving the ratio control signal S2; the second current generation circuit 112 further includes a duty cycle amplification circuit 1122, and the duty cycle amplification circuit 1122 is configured to amplify the duty cycle of the PWM dimming signal by m times upon receiving the ratio control signal S2 to get the second dimming signal, and the second current generation circuit 112 generates a second current i2 related to the duty cycle of the second dimming signal according to the second dimming signal; Wherein n is a positive great than 0 and smaller than 0.1, and m is a positive greater than 1, and the product of n and m is smaller than or equal to 1. Exemplarily, in one embodiment, the first voltage control current source U01 in the first current generation circuit 101 may be set to amplify the trans-conductance to m times of the initial trans-conductance upon receiving the ratio control signal S2, wherein the initial trans-conductance is the trans-conductance when the first voltage control current source U01 does not receive the ratio control signal S2. Exemplarily, in one embodiment, n is set to 0.05 while m is 10, that is, when the duty cycle of the PWM dimming signal is smaller than 5%, the duty cycles of the first current i1 and the PWM dimming signal are both amplified by 10 times. Further, in one embodiment, it may amplify the first threshold voltage Vref1 by m times when the ratio control signal S2 is valid. In another embodiment, it may also amplify the capacitance value of the first capacitor C01 by m times when the ratio control signal S2 is valid, and this can avoid making the first capacitive voltage VC be too large, and meanwhile it does not need to amplify the first threshold voltage Vref1. In this embodiment, when the duty cycle of the PWM dimming signal is small, the first current and the duty cycle of the PWM dimming signal are amplified, which can avoid processing small signals and enhancing the dimming accuracy.

Figure 6:
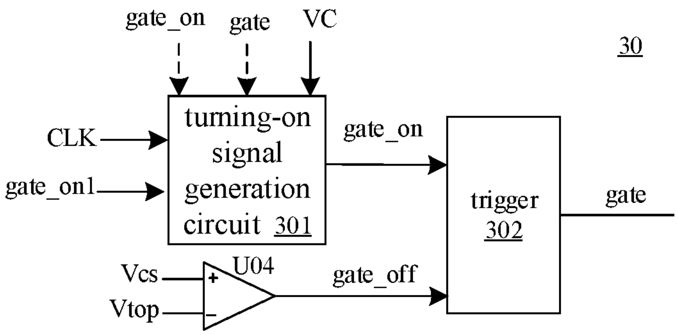
FIG. 6 is a schematic view of an embodiment of the first control circuit of the present invention.
Figure 8:
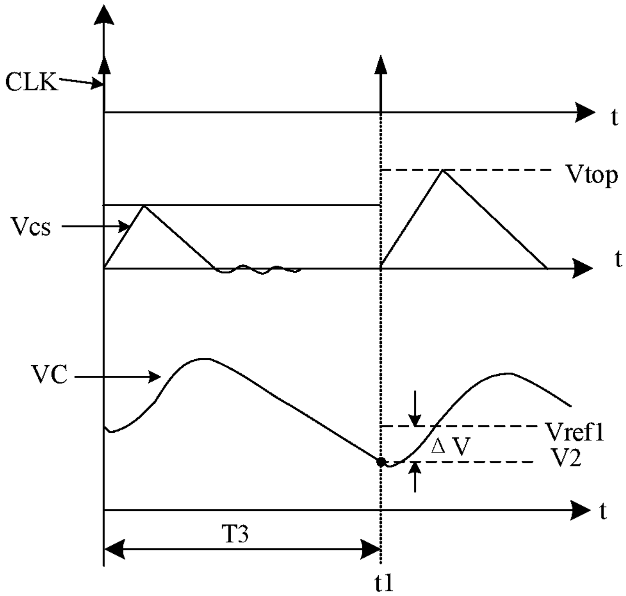
FIG. 8 is a waveform schematic view that the first capacitive voltage at the first moment is less than the first threshold voltage of an embodiment of the present invention.

In one embodiment, as shown in FIG. 6, the first control circuit 30 includes a turning-on signal generation circuit 301, a second comparison circuit U04, and a trigger 302. The turning-on signal generation circuit 301 receives the first capacitive voltage VC and the first turning-on signal gate_on1 generated by the first computation circuit 10, and further receives the clock signal CLK, and generates a turning-on signal gate_on to control the start moment of the next switch period of the power transistor M01 according the comparison result of the first capacitive voltage VC at the first moment t1 and the first threshold voltage Vref1; If the first capacitive voltage VC at the first moment t1 is great than the first threshold voltage Vref1, then a turning-on signal gate on is generated according to the first turning-on signal gate-on1, that is, when the first capacitive voltage VC achieves the first threshold voltage Vref1, control the power switch transistor M01 to turn on to start the next switch period, that is, when the switch period achieves the second time T2 as described in the previous text, control the power switch transistor M01 to turn on to start the next switch period. If the first capacitive voltage VC at the first moment t1 is smaller than or equal to the first threshold voltage Vref1, as shown in FIG. 8, the turning-on signal gate_on is generated according to the clock signal CLK. For example, it may control the power switch transistor M01 to turn on to start the next switch period when the clock signal CLK denotes valid. Wherein, refer to FIG. 8, the first moment t1 is the moment when starts from the start moment of a switch period and delays by the third time T3, and the third time T3 is equal to the period of the clock signal CLK. The first input terminal of the second comparison circuit U04 receives the inductance current sampling signal Vcs, and the second input terminal receives the upper limit voltage Vtop, and generates a turning-off signal gate_off according to the comparison result of the inductance current sampling signal Vcs and the first upper limit voltage Vtop. Trigger 302 receives the turning-on signal gate_on and the turning-off signal gate_off to output the switch signal gate; when the tuning-on signal gate_on denotes valid, the switch signal gate changes from invalid to valid; when the turning-off signal gate_off denotes valid, the switch signal gate changes from valid to invalid. The switch signal gate is for controlling the turning-on and -off of the power switch transistor M01; when the switch signal gate is valid, the power switch transistor M01 is turned on; when the switch signal gate is invalid, the power switch transistor M01 is turned off. Wherein, the turning-on signal generation circuit 301 receives the turning-on signal gate_on, or receives the switch signal gate to determine the start moment of each switch period.

It can be understood that in other embodiments, the first control circuit may also be configured to determine generating the turning-on signal according to the first turning-on signal gate_on1 or according to the clock signal CLK by detecting the working mode of the power stage circuit and/or the duty cycle of the PWM dimming signal. For example, in one embodiment, the first control circuit may be configured to generate the turning-on signal gate_on to control the start moment of the next switch period of the power switch transistor according to the first turning-on signal gate_on1 after the power stage circuit enters the DCM working mode is detected, and generates the turning-on signal controlling the start moment of the next switch period of the power switch transistor according to the clock signal CLK after the power stage circuit enters the continuous conduction mode (CCM) is detected.

Figure 7:
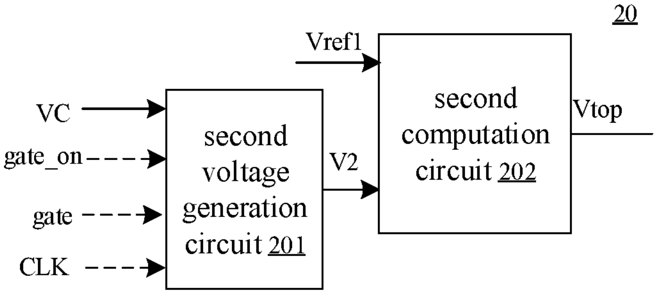
FIG. 7 is a schematic view of an embodiment that the first upper limit voltage generation circuit of the present invention.

The first upper limit voltage generation circuit 20 is for generating the first upper limit voltage Vtop, as shown in FIG. 7, in an embodiment, the first upper limit voltage generation circuit 20 includes a second voltage generation circuit 201 and second computation circuit 202. The second voltage generation circuit 201 is for generating the second voltage V2; in one embodiment, the second voltage V2 may be the first capacitive voltage at the moment when the power switch transistor M01 starts to turn on; the second voltage generation circuit 201 receives the turning-on signal gate_on or the switch signal gate generated by the first control circuit 30, and receives the first capacitive voltage VC generated by the first computation circuit 10, and outputs the first capacitive voltage VC as the second voltage V2 when the turning-one signal gate_on or the switch signal gate denotes valid. Correspondingly, the second computation 202 may be configured to generate the above first upper limit voltage Vtop according to the difference value of the first threshold voltage Vref1 and the second voltage V2. In another embodiment, the second voltage V2 may be the first capacitive voltage when the clock signal CLK denotes valid, and the second voltage generation circuit 201 receives the clock signal CLK, and receives the first capacitive voltage VC generated by the first computation circuit 10, and outputs the first capacitive voltage VC as the second voltage V2 when the clock signal CLK denotes valid. Correspondingly, the second computation circuit 202 may be configured to set the first upper limit voltage Vtop as the aforementioned fixed voltage when the first control circuit 30 controls the the power switch transistor M01 to turn on according to the first turning-on signal gate_on1; when the first control circuit 30 controls the power switch transistor M01 to turn on when the clock signal CLK denotes valid, the first upper limit voltage Vtop is generated according to the difference value of the first threshold voltage Vref1 and the second voltage V2.

Specially, the following will further describe the first upper limit voltage generation circuit 20 by taking the second voltage V2 as the first capacitive voltage when the power switch transistor M01 starts to turn on with reference to FIG. 8. Wherein, the second computation circuit 202 may be configured as: the first upper limit voltage Vtop=Vmin+k·ΔV, wherein k is any positive, Vmin denotes the aforementioned fixed voltage, ΔV denotes the difference value between the first threshold voltage Vref1 and a second voltage V2, i.e. ΔV=Vref1−V2, V2 denotes the second voltage, and Vref1 denotes the first threshold voltage. When the duty cycle of the PWM dimming signal is relatively small, the current value of the second current i2 is also relatively small, and the drop speed of the first capacitive voltage VC is slow, and the first capacitive voltage VC at the first moment t1 is larger than the first threshold voltage Vref1, the first control circuit 30 will control the power switch transistor M01 to turn on when the first capacitive voltage VC achieves the first threshold voltage Vref1, the power stage circuit enters the DCM working mode, and at this time, the first capacitive voltage at the moment when the power switch transistor M01 starts to turn on is equal to the first threshold voltage Vref1, that is, the second voltage V2 output by the second voltage generation circuit 201 is equal to Vref1, here ΔV=Vref1−V2=0, Therefore, after the power stage circuit enters the DCM working mode, the first upper limit voltage generated by the second computation circuit 202 is Vtop=Vmin+k·ΔV=Vmin, that is, the first upper limit voltage Vtop is equal to the fixed voltage Vmin. When the duty cycle of the PWM dimming signal increases, the current value of the second current i2 increases, as shown in FIG. 8, the drop speed of the first capacitive voltage VC becomes fast, causing the first capacitive voltage VC at the first moment t1 be smaller than the first threshold voltage Vref1, the first control circuit 30 will control the power switch transistor M01 to turn on to start the next switch period when the clock signal CLK denotes valid, and the power stage circuit enters a fixed-frequency working mode, it can be seen from FIG. 8, the first capacitive voltage at the moment when the power switch transistor M01 starts to turn on is the second voltage V2, and the second voltage V2 is smaller than the first threshold voltage Vref1, i.e., ΔV=Vref1−V2>0; at this time, the first upper limit voltage generated by the second computation circuit 202 is Vtop=Vmin+k−ΔV>Vmin, i.e., the first upper limit voltage Vtop will increase, and the bigger the difference between the first threshold voltage Vref1 and the second voltage V2, the bigger the increases degree of the first upper limit voltage Vtop, and this can ensure that when the duty cycle of the PWM dimming signal increases, the power stage circuit can gradually enter the CCM working mode from the DCM working mode.

It can be understood that in other embodiments, the first upper limit voltage generation circuit can also be configured to generate the first upper limit voltage by detecting the working mode of the power stage circuit and the duty cycle of the PWM dimming signal, or generate the first upper limit voltage according to the duty cycle of the PWM dimming signal; for example, in one embodiment, the first upper limit voltage generation circuit may be configured to generate the first upper limit voltage equal to the fixed voltage when it detects that the power stage circuit enters the DCM working mode; after the power stage circuit enters the CCM working mode, by using a PWM conversion circuit and according to the PWM dimming signal, generates a reference voltage signal related to the duty cycle of the PWM dimming signal, and by using an operational amplifier to perform error amplification operation on the reference voltage signal and the feedback voltage denoting the LED current to obtain the first upper limit voltage. It can be easily obtained by those skilled in art directly or undoubtedly based on the contents of this specification, details omitted here.

To sum up, the embodiment of the present invention controls the turning-on of the power switch according to the first turning-on signal denoting that the switch period achieves the second time generated by the first computational circuit when the duty cycle of the PWM dimming signal is relatively small, avoids using the operational amplifier when the duty cycle of the PWM dimming signal is relatively small, so as to reduce the dimming error. Moreover, the present invention can avoid processing small signals by controlling the charging the first capacitor by the first current and/or controlling the amplification of the first current and the duty cycle of the PWM dimming signal within the first time, so as to further reduce the dimming error, realizing high dimming accuracy when the duty cycle of the PWM dimming signal is relatively small. On the other hand, the present invention can avoid using operational amplification to control the low-frequency PFM working mode, so as to avoid the current flowing through the LED load being unstable, realizing providing the LED load with stable current when the duty cycle of the PWM dimming signal is relatively small.

The above implementations do not form the restriction on the protection scope of the technical solutions. Any amendments, equivalent replacements, and improvements made within the spirits and principles of the above implementations are all included in the protection scope of the technical solutions.

What is claimed is:

1. A dimming method configured in a dimming circuit to drive an LED load, wherein the dimming circuit comprises a power stage circuit, and the power stage circuit comprises a power switch transistor, wherein after the power stage circuit enters a discontinuous conduction mode (DCM) working mode, obtaining a first integral value according to an inductance current in a switch period of the power switch transistor, and obtaining a second time according to the first integral value and a duty cycle of a pulse width modulation (PWM) dimming signal, controlling the power switch transistor to turn on to start a next switch period when the switch period reaches the second time;

setting a first upper limit voltage to a fixed voltage; when a sampling signal of the inductance current representing the inductance current of the power stage circuit reaches the first upper limit voltage, controlling the power switch transistor to turn off, generating a first current according to the sampling signal of the inductance current;

generating a second current related to the duty cycle of the PWM dimming signal according to the PWM dimming signal;

charging a first capacitor by the first current, and the second current makes the first capacitor discharge;

wherein after the power stage circuit enters the DCM working mode, the second time is a time starting from a starting moment of the switch period to when a voltage of the first capacitor reaches a first threshold voltage in the switch period;

wherein a current value of the second current is greater than zero, wherein when the duty cycle of the PWM dimming signal is smaller than n, amplifying the first current by m times; and meanwhile amplifying the duty cycle of the PWM dimming signal by m times to obtain a second dimming signal, and generating a second current related to the duty cycle of the second dimming signal according to the second dimming signal, wherein, n is a positive number greater than 0 and less than or equal to 0.1, m is a positive number greater than 1, and a product of n and m is less than or equal to 1.

2. The dimming method according to claim 1, wherein the first integral value is obtained according to the inductance current of a first time in the switch period of the power switch transistor;

wherein the first time comprises a time when the inductance current in the switch period is not zero.

3. The dimming method according to claim 1, wherein the first current charges the first capacitor within a first time;

wherein the first time comprise a time when the inductance current is not zero.

4. The dimming method according to claim 1, wherein when the duty cycle of the PWM dimming signal is less than n, a capacitance value of the first capacitor is simultaneously amplified by m times.

5. The dimming method according to claim 1, comprising:

detecting a first capacitive voltage at a first moment;

if the first capacitive voltage at the first moment is greater than the first threshold voltage, controlling the power switch transistor to be turned on to start the next switch period when the first capacitive voltage reaches the first threshold voltage; and if the first capacitive voltage at the first moment is smaller than or equal to the first threshold voltage, controlling the power switch transistor to turn on to start the next switch period when a clock signal denotes valid, wherein the first moment is a moment, wherein the moment starts from a start moment of a switch period and delays by a third time, and the third time is equal to a period of the clock signal.

6. A dimming method configured in a dimming circuit to drive an LED load, wherein the dimming circuit comprises a power stage circuit, and the power stage circuit comprises a power switch transistor, wherein after the power stage circuit enters a discontinuous conduction mode (DCM) working mode, obtaining a first integral value according to an inductance current in a switch period of the power switch transistor, and obtaining a second time according to the first integral value and a duty cycle of a pulse width modulation (PWM) dimming signal; controlling the power switch transistor to turn on to start a next switch period when the switch period reaches the second time;

setting a first upper limit voltage to a fixed voltage; when a sampling signal of the inductance current representing the inductance current of the power stage circuit reaches the first upper limit voltage, controlling the power switch transistor to turn off;

generating a first current according to the sampling signal of the inductance current;

generating a second current related to the duty cycle of the PWM dimming signal according to the PWM dimming signal;

charging a first capacitor by the first current, and the second current makes the first capacitor discharge;

wherein after the power stage circuit enters the DCM working mode, the second time is a time starting from a starting moment of the switch period to when a voltage of the first capacitor reaches a first threshold voltage in the switch period;

wherein a current value of the second current is greater than zero;

detecting a first capacitive voltage at a first moment;

if the first capacitive voltage at the first moment is greater than the first threshold voltage, controlling the power switch transistor to be turned on to start the next switch period when the first capacitive voltage reaches the first threshold voltage;

if the first capacitive voltage at the first moment is smaller than or equal to the first threshold voltage, controlling the power switch transistor to turn on to start the next switch period when a clock signal denotes valid;

wherein the first moment is a moment, wherein the moment starts from a start moment of a switch period and delays by a third time, and the third time is equal to a period of the clock signal;

wherein the first upper limit voltage is obtained according to a difference between the first threshold voltage and a second voltage;

wherein, the second voltage is the first capacitive voltage at a moment when the power switch transistor starts to turn on.

7. The dimming method according to claim 5, wherein the first upper limit voltage is obtained according to a difference of the first threshold voltage and a second voltage;

wherein, the second voltage is the first capacitive voltage at a time when the clock signal denotes valid.

8. A dimming circuit to drive LED load, wherein the dimming circuit comprises a power stage circuit and a dimming control circuit, and the power stage circuit comprises a power switch transistor, wherein after the power stage circuit enters a DCM working mode, the dimming control circuit:

obtains a first integral value according to an inductance current in a switch period of the power switch transistor; obtains a second time according to the first integral value and a duty cycle of a PWM dimming signal; controls the power switch transistor to turn on to start a next switch period when the switch period reaches the second time;

setting a first upper limit voltage to a fixed voltage; when a sampling signal of the inductance current representing the inductance current of the power stage circuit reaches the first upper limit voltage, controls the power switch transistor to turn off, wherein the dimming control circuit comprises a first computation circuit, wherein the first computation circuit comprises:

a first current generation circuit outputting a first current according to the sampling signal of the inductance current;

a second current generation circuit receiving the PWM dimming signal and outputting a second current related to the duty cycle of the PWM dimming signal;

a first capacitor, wherein the first capacitor is charged by using the first current, and the second current makes the first current discharge; and a first comparative circuit, wherein a first input terminal receives a first threshold voltage, and a second input terminal receives a first capacitive voltage and generates a first turning-on signal according to a comparison result of the first capacitive voltage and the first threshold voltage;

wherein after the power stage circuit enters the DCM working mode, the first turning-on signal denotes that the switch period achieves the second time, and the dimming control circuit controls a turning-on of the power switch transistor according to the first turning-on signal;

wherein a current value of the second current is greater than zero.

9. The dimming circuit according to claim 8, wherein the first current generation circuit comprises:

a first voltage control current source receiving the sampling signal of the inductance current to output the first current.

10. The dimming circuit according to claim 8, wherein the second current generation circuit comprises:

a filtering circuit receiving the PWM dimming signal and filtering the PWM dimming signal to output a filtering signal; and a second voltage control current source receiving the filtering signal to output the second current.

11. The dimming circuit according to claim 8, wherein the first computation circuit further comprises:

a second control circuit, wherein the second control circuit detects the inductance current or the first current and outputs a first control signal, and the first control signal is in a valid state at least when a current value of the inductance current or the first current is not zero; and a first switch, wherein a first terminal of the first switch is connected to an output terminal of the first current generation circuit, a second terminal of the first switch is connected to the first capacitor, and the control terminal receives the first control signal;

wherein the first switch is turned on when the first control signal is valid; and the first switch is turned off when the first control signal is invalid.

12. The dimming circuit according to claim 8, wherein the first computation circuit further comprises a duty cycle detection circuit, wherein the duty cycle detection circuit is configured to output a ratio control signal upon detecting that the duty cycle of the PWM dimming signal is smaller than n;

a first current generation circuit configured to amplify the first current by m times upon receiving the ratio control signal; and a second current generation circuit, wherein the second current generation circuit comprises a duty cycle amplification circuit, the duty cycle amplification circuit is configured to amplify the duty cycle of the PWM dimming signal by m times upon receiving the ratio control signal to obtain a second dimming signal, and the second current generation circuit generates a second current related to a duty cycle of the second dimming signal according to the second dimming signal;

wherein n is a positive greater than 0 and smaller than or equal to 0.1, m is a positive great than 1, and a product of n and m is smaller than or equal to 1.

13. The dimming circuit according to claim 12, wherein a capacitance value of the first capacitor is amplified by m times when the ratio control signal is valid.

14. The dimming circuit according to claim 8, wherein the dimming control circuit further comprises a first control circuit, and the first control circuit comprises:

a turning-on signal generation circuit, wherein the turning-on signal generation circuit is configured to generate a turning-on signal to control a start moment of the next switch period of the power switch transistor according to the comparison result of the first capacitive voltage at the first moment and the first threshold voltage;

if the first capacitive voltage at the first moment is greater than the first threshold voltage, the turning-on signal is generated according to the first turning-on signal;

if the first capacitive voltage at the first moment is smaller than or equal to the first threshold voltage, the turning-on signal is generated according to a clock signal;

wherein the first moment is a moment, wherein the moment starts from a start moment of a switch period and delays by a third time, and the third time is equal to a period of the clock signal.

* * * * *